United States Patent Office 3,346,334
Patented Oct. 10, 1967

3,346,334
AMMONIUM SILICATES
Helmut Hans Wilhelm Weldes, Havertown, Pa., and Mahlon Robert Derolf, Blackwood, N.J., assignors to Philadelphia Quartz Company, Philadelphia, Pa., a corporation of Pennsylvania
No Drawing. Filed Dec. 16, 1963, Ser. No. 330,575
6 Claims. (Cl. 23—110)

This invention generally relates to a new process which results in the production of ammonium silicate solutions which have not been known before. More particularly this invention relates to the production of novel ammonium silicates having a lower alkali metal ion content and a smaller particle size than has ever been known. There has long been a demand for a solution of a substantially alkali metal-free ammonium silicate having high ratios of $SiO_2$ and $(NH_4)_2O$ with respect to alkali metal oxide and a low silica micelle diameter. While there have been a number of *attempts* to prepare such solutions, none has been successful in a practical sense.

Efforts to prepare ammonium silicates directly have failed. Ammonium hydroxide is not a strong enough alkali to dissolve silica gel even under conditions of elevated temperature and pressure.

Double ammonium and alkali metal silicates lack the properties sought from ammonium silicate solutions.

In the prior art, silica sols stabilized with ammonia have been known. Usually the sol has been prepared by one of the usual processes and then has been stabilized by the addition of ammonia as an alkaline stabilizing agent. In other cases, silica gel has been peptized by treating the gel under various conditions with ammonium hydroxide.

In some cases, the sol has been prepared by removing the alkali metal with ion exchange resins and then stabilizing by the addition of ammonia. The preparation of such a stabilized sol has also been carried out by treating a sodium silicate solution with an ion exchange resin in the ammonia form. All of these processes have resulted in products with low ratios of silica to alkali metal oxide and/or ammonium oxide to alkali metal oxide although they may be substantially free of alkali metal ions. The silica particles are in the colloidal range and have a low viscosity even at high concentrations because of the density of the silica particles. In other words, these prior art stabilized sols, which have in some cases been called ammonium silicates, are more accurately described as stabilized silica sols.

The records of many years show the desire for ammonium silicates (substantially free of alkali metal ions) for the treatment of clays, for humidity control, for cements, coatings and adhesives. Such cements, coatings and adhesives should have higher resistance to breakdown by heat or weather. It is the primary object of this invention to produce such ammonium silicates. Various other objects and advantages will be apparent after reading the following detailed general description and examples.

In this application the ratios refered to are mole ratios and the particle sizes are average particle sizes unless otherwise specified.

THE PRESENT INVENTION

Considered from one aspect the present invention involves a method which comprises:
 (a) Introducing an aqueous solution of an alkali metal silicate into a reaction zone,
 (b) Also introducing into said reaction zone a material selected from the group consisting of ammonia and ammonium hydroxide and bringing said material into admixture with said alkali metal silcate to thereby produce a double silicate solution of an alkali metal and ammonia,
 (c) Contacting said double silicate solution with a cation exchange resin that is 50% to 100% saturated with ammonia,
 (d) Recovering an ammonium silicate solution that has a ratio of $SiO_2$ to alkali metal oxide of at least 25; an $(NH_4)_2O$ to alkali metal oxide ratio that is at least 8, and that has silica micelles that are on the average not larger than about 3 m$\mu$ in diameter.

As our alkali metal silicate solution we prefer to use sodium or potassium silicate solutions having the highest possible ratio of silica to alkali metal oxide since this reduces the amount of alkali metal which has to be removed during subsequent processing. As a practical matter, the ratio of $SiO_2$ to metal oxide may vary from about 2 to about 4. At the lower ratios, the effect on the final alkali metal content of ammonia added to the silicate solution is much less noticeable because of the relatively higher concentrations of alkali metal and the long time required to remve the last residues of alkali metal oxide.

Also, as a practical matter, we would not expect to use a concentration of $SiO_2$ which would result in final products having a $SiO_2$ content lower than about 1% by weight. We may use silicate solutions which will result in final products having up to about 12% by weight $SiO_2$ but if nearly complete removal of $Na_2O$ is required we find that final $SiO_2$ concentrations of about 6 or 7% $SiO_2$ are preferred.

With regard to the ammonia or ammonium hydroxide, diluted commercial ammonia (29% $NH_3$) is preferred because of its availability.

The ammonia or ammonium hydroxide is usually added to the point of instability, and more particularly the amount is chosen so that the ratio of $SiO_2$ to $(NH_4)_2O$ is within the range of about 2 to about 6, and preferably below about 4. If the amount of ammonia or ammonium hydroxide is increased beyond the amount indicated by this range the volatility of the ammonia in both the initial double silicate solutions and the final ammonium silicate porduct also increases and the actual loss of $NH_3$ as well as the odor becomes a problem. Too high proportions of ammonia tend to precipitate silica or an ammonium silicate complex. It is preferable to avoid such precipitation.

The double silicate solution prepared according to the above procedure may contain from about 1 to 12% by weight of $SiO_2$; a $SiO_2$ to alkali metal oxide ratio of between about 2 and 4; and a $(NH_4)_2O$ to alkali metal oxide ratio of between about 0.4 and 2.5.

The above double silicate solution may be slurred or otherwise treated concurrently or counter-currently with a cation exchange resin loaded with ammonia. A number of cation exchangers are suitable for the present process and by way of example the cation exchangers set forth in U.S.P. 2,671,056 are suitable.

The cation exchange resin we have found most suitable is a highly cross-linked nuclear sulfonic acid type cation exchanger, but other known cation exchangers may also be used. A typically suitable resin is shown in the examples below. In order to use this base exchange resin we treat it with the required amount of ammonia in order to prevent undue loss of ammonia from the double silicate solution while removing the alkali metal ion therefrom. In general, we prefer to use resin saturated with ammonia; that is, with 100% loading, but lesser loading such as 90%, 75% or even 50% may be used. Resins with lower ammonia loading will remove ammonia along with the alkali metal ion from the double silicate solution and thus we prefer to use the saturated resins or those having a 90–100% ammonia loading.

The contact time of the ammonia loaded resin with the double silicate solution was usually about six minutes in our experiments. Longer or shorter times (e.g. 4–30 minutes) may be used, but as a practical matter we have found that the content of alkali metal ion is reduced to a reasonable low level in about six minutes. While this low level would be further reduced by longer exposure, the *rate* of removal would of course be less.

It is preferred that the ratio of grams of double silicate solution to ml. of cation exchange resin fall within the range of about .40 gr./ml. to about 2.5 gr./ml. With higher proportions of loaded resin the required contact time can be shorter but our experience has been that very good results can be obtained in the six minutes on which we have standardized when using the proportion of resin shown in our examples. When a ratio of resin to silicate solution exceeds that indicated by the above range it has been observed that all of the double silicate solutions may become absorbed by the resin, which results in a semi-solid mass.

After treatment of the double silicate with the resin in the manner set forth above, the resin and product solution are separated. The resin may then be regenerated and reused.

The ammonium silicate solution which is the product of our invention has a ratio of $SiO_2$ to alkali metal oxide of at least about 25 and up to 150 or higher. We prefer products having a ratio of at least 50. The mole ratio of ammonium oxide to alkali oxide is greater than 8 and ranges up to about 40 or more. The mole ratio of $SiO_2$ to ammonium oxide can be lower than the mole ratio of silica to $Na_2O$ in the starting sodium silicate solution and preferably ranges from about 2 to 8. The silica concentration in the final product may be as high as 12% by weight of $SiO_2$ although we prefer to prepare solutions at about 6% $SiO_2$ as we have found that these are more readily prepared with low alkali metal contents. The silica micelles are on the average not longer than about 3 millimicrons in diameter (which is substantially less than those available from commercial silica sols, including silica sols which are stabilized by ammonia).

The ammonium silicate in solution is not stable on heating and it is, therefore, difficult to concentrate such a solution without loss of ammonia. Also, heating increases the size of the silica micelles or silica particles present in the solution.

These ammonium silicate solutions are compatible with water-miscible organic solvents. For instance, an ammonium silicate produced in accordance with this invention and having a ratio of 2.46 $SiO_2/(CNH_4)_2O$ and 5.7% by weight of $SiO_2$ is infinitely miscible with methanol and *two or more* times more miscible with other water miscible organic solvents (such as methanol, ethanol, isopropyl alcohol, acetone, dioxane, tetrahydrofuran) than is a sodium silicate having the same ratio and concentration. Our ammonium silicate solutions are, therefore, more applicable in liquid detergents, for instance.

to alkali metal oxide stabilized silica sols in an amount calculated to give compositions approximately the same as the ammonium silicate solutions formed by the method of our invention. Light scattering data shows that not only are the particle sizes much larger in such stabilized silica sols but in addition the particle sizes are increased by the addition of the ammonia. More specifically, our ammonium silicate solutions have average particles in sizes not larger than about 1–3 millimicrons whereas the stabilized sols have particle sizes not smaller than about 7 m$\mu$ (and not smaller than about 10 m$\mu$ after the addition of ammonia).

EXAMPLES IN GENERAL

The following examples are illustrative of some preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

In the following examples the ammonia solution referred to is the standard commercial ammonia solution containing 29% $NH_3$. The ammonium sulfate used is reagent grade. Ludox SM and Ludox HS are alkali stabilized silica sols solid by E. I. du Pont de Nemours & Co. Ludox SM has a particle size of about 7 m$\mu$, and Ludox HS has a particle size of about 15 m$\mu$. "S-35" is the trademark of the Philadelphia Quartz Company for a sodium silicate solution having a $SiO_2$ to $Na_2O$ ratio by weight of 3.75 to 1 and which contains 25.3% by weight $SiO_2$. "D" is the trademark of the Philadelphia Quartz Company that designates a sodium silicate solution having a $SiO_2$ to $Na_2O$ ratio by weight of 2:1 and which has a silica content of 29.4 weight percent. The particle sizes in these soluble silicate solutions are not more than about 1 m$\mu$.

Example 1

A solution of 250 grams of "S-35" sodium silicate was diluted with 805 grams of distilled water *without the addition of ammonia*. This solution contained 1.60% $Na_2O$, 6.00% $SiO_2$, and had a mole ratio of $SiO_2/Na_2O$ of 3.87.

A 100% ammonia loaded Amberlite IR-124 resin was prepared by treating 500 ml. of the cation exchange resin in the hydrogen form with a solution of 280 g. of ammonium sulfate in 500 g. of water. This was twice the stoichiometric amount of ammonium ion needed to convert all of the exchange capacity of the resin. The treated resin was washed free of sulfate ions and 20 grams of the above dilute sodium silicate solution were treated with 15, 20 and 25 ml. of the ammonia loaded resin. The compositions of the resulting ammonium silicate solutions are shown in the following table:

| Amount of Resin (ml.) | Mole Ratios ||| $Na_2O$ (percent) | $(NH_4)_2O$ (percent) | $SiO_2$ (percent) |
|---|---|---|---|---|---|---|
| | $SiO_2/(NH_4)_2O$ | $SiO_2/Na_2O$ | $(NH_4)_2O/Na_2O$ | | | |
| 15 | 7.44 | 25.7 | 3.60 | 0.24 | 0.69 | 9.99 |
| 20 | 8.42 | 26.9 | 3.19 | 0.23 | 0.61 | 5.77 |
| 25 | 9.22 | 32.6 | 3.53 | 0.19 | 0.55 | 5.97 |

It should be noted that the amount of alkali metal ion in the product of this invention is less than would be present if exactly the same exchange process was carried out with sodium silicate rather than the double silicate which we use.

The process and products of this invention are definitely quite different from any similar prior art process or product, as will be evident from the examples which follow.

In order to illustrate one difference, we added ammonia

Example 2

The advantage of treating a double silicate solution containing an alkali metal and ammonia with a 100% ammonia loaded cationic resin, as we have discovered by our invention, is illustrated by the following example.

A double silicate solution A was prepared by diluting 250 grams of "S-35" with 500 grams of water and then mixing with a solution of 29.9 grams of aqueous ammonia in 275.1 grams of water. These components were mixed with vigorous stirring and formed a slightly hazy, stable solution containing 1.60% $Na_2O$, 1.25% $(NH_4)_2O$, 6.00% $SiO_2$. The solution had mole ratios as shown in the table below, and 20 gram portions of A were treated with increasing amounts of the 100% loaded resin, as shown, for six minutes.

| Amount of Resin | Mole Ratios | | | $Na_2O$ (percent) | $(NH_4)_2O$ (percent) | $SiO_2$ (percent) |
|---|---|---|---|---|---|---|
| | $SiO_2/(NH_4)_2O$ | $SiO_2/Na_2O$ | $(NH_4)_2O/Na_2O$ | | | |
| A alone | 4.16 | 3.87 | 0.93 | 1.60 | 1.25 | 6.00 |
| 15 ml | 3.64 | 25.3 | 6.94 | 0.23 | 1.34 | 5.62 |
| 20 ml | 3.64 | 34.1 | 9.37 | 0.17 | 1.34 | 5.62 |
| 25 ml | 3.88 | 36.3 | 9.36 | 0.16 | 1.25 | 5.62 |

A double silicate solution B was also prepared by adding a solution of 59.8 grams of aqueous ammonia in 245.2 grams of water to 250 grams of "S-35" diluted with 500 grams of water. This also formed a slightly hazy, stable solution containing 1.60% $Na_2O$, 2.51% $(NH_4)_2O$, 6.00% $SiO_2$, and with mole ratios as shown in the table. In each case 20 gram portions of this double silicate solution B were treated with increasing amounts of the 100% ammonia loaded resin for six minutes, with the results shown below:

| Amount of Resin | Mole Ratios | | | $Na_2O$ (Percent) | $(NH_4)_2O$ (Percent) | $SiO_2$ (Percent) |
|---|---|---|---|---|---|---|
| | $SiO_2/(NH_4)_2O$ | $SiO_2/Na_2O$ | $(NH_4)_2O/Na_2O$ | | | |
| B | 2.07 | 3.87 | 1.87 | 1.60 | 2.51 | 6.05 |
| 15 ml | 2.35 | 31.2 | 13.3 | 0.20 | 2.23 | 6.05 |
| 20 ml | 2.45 | 41.6 | 17.0 | 0.15 | 2.14 | 6.05 |
| 25 ml | 2.55 | 89.4 | 35.0 | 0.07 | 2.06 | 5.83 |
| 30 ml | 2.64 | 100.5 | 38.1 | 0.06 | 1.92 | 5.83 |
| 35 ml | 2.86 | 67.0 | 23.4 | 0.09 | 1.77 | 5.87 |
| 40 ml | 3.12 | 75.4 | 24.1 | 0.08 | 1.62 | 5.83 |
| 50 ml | 3.58 | 117.6 | 32.9 | 0.05 | 1.38 | 5.03 |

It is evident that the best result was obtained in the last series using 30 ml. of 100% ammonia loaded resin with 20 grams of double silicate solution B. This test was repeated on a larger scale with the same results. The ammonium silicate solutions obtained were stable for at least several weeks. Since they smell strongly of ammonia they should be kept in closed containers to prevent loss of $NH_3$. The solutions are slightly hazy and water thin.

In order to make a comparison between the particle size of ammonium silicates produced in accordance with this invention and alkali stabilized silica sols that have had ammonia added to them, several tests were carried out. 100 grams of Ludox SM having particles of 7 m$\mu$ in size was treated with 11.4 grams of aqueous ammonia. Also, 100 grams of Ludox HS having a particle size of 15 m$\mu$ were treated with 22.8 grams of aqueous ammonia. Both mixtures were diluted to 500 grams with water and formed stable mixtures having the composition shown below:

| Silica Source | Mole Ratios | | | $Na_2O$ (Percent) | $(NH_4)_2O$ (Percent) | $SiO_2$ (Percent) |
|---|---|---|---|---|---|---|
| | $SiO_2/(NH_4)_2O$ | $SiO_2/Na_2O$ | $(NH_4)_2O/Na_2O$ | | | |
| Ludox SM | 2.61 | 155.0 | 59.4 | 0.04 | 1.99 | 6.00 |
| Ludox HS | 2.61 | 101.0 | 38.7 | 0.06 | 1.99 | 6.00 |
| Ammonium Silicate | 2.58 | 62.0 | 24.0 | 0.10 | 2.01 | 5.98 |

Each of these solutions was given a standard light scattering test and compared with the original Ludox HS and Ludox SM. It was found that the ammonium silicate solution had particle sizes of 2 to 3 millimicrons which was well below the particle size of Ludox SM (7 m$\mu$) without ammonia. The particle size of Ludox SM is increased about 10 millimicrons by the addition of ammonia. The particle size of Ludox HS was found to have increased from 15 to about 19.5 m$\mu$ by the addition of ammonia.

(For this test we used a Lumetron colorimeter sold by Photovolt Corporation. The scale setting 100 was standardized with a 1.25% silica sol of known particle dimension (Ludox SM) using throughout the test the filter for a wavelength of 365 m$\mu$ and a mercury vapor lamp.)

*Example 3*

In this example the double silicate was treated with a 50% ammonia loaded resin to demonstrate the importance of using a nearly saturated resin. The double silicate was prepared by diluting 250 grams of "S-35" with 500 grams of water and adding 22.2 grams of aqueous ammonia diluted with 282.8 grams of water. The slightly hazy, stable solution obtained had a concentration of 1.60% $Na_2O$, 0.93 $(NH_4)_2O$ and 6.00% $SiO_2$ with a mole ratio of $SiO_2/Na_2O$ of 3.87, $SiO_2/(NH_4)_2O$ of 5.56 and $(NH_4)_2O/Na_2O$ of 0.70. 60 grams of this double silicate solution were treated with 45 ml. of a 50% ammonia loaded resin for six minutes. The loaded resin was prepared as previously described. A stable solution was obtained having 0.11% of $Na_2O$, 0.24% of $(NH_4)_2O$ and 5.86% of $SiO_2$ with a mole ratio of $SiO_2/Na_2O$ of 55.1, $SiO_2/(NH_4)_2O$ of 20.76 and $(NH_4)_2O/Na_2O$ of 2.66.

It contained almost as much $Na_2O$ as ammonia and it was evident that some ammonia, as well as the sodium, was removed by the ion exchange resin.

*Example 4*

A further series of tests was carried out using D sodium silicate at 6% $SiO_2$ concentration. A starting solution $a$ was prepared with 40.8 grams of D diluted with 159.2 grams of water. A double silicate starting solution $b$ was prepared with 40.8 grams of D, 153.5 grams of water and 5.7 grams of aqueous ammonia. Also a double silicate starting solution $c$ was composed of 40.8 grams of D, 147.8 grams of water and 11.4 grams of aqueous ammonia. 20 gram portions of these three starting solutions were treated for six minutes with varying amounts of ammonia saturated resin as shown in the following table:

| Amount of Resin | Mole Ratios | | | $Na_2O$ (percent) | $(NH_4)_2O$ (percent) | $SiO_2$ (percent) |
|---|---|---|---|---|---|---|
| | $SiO_2/(NH_4)_2O$ | $SiO_2/Na_2O$ | $(NH_4)_2O/Na_2O$ | | | |
| Starting Solution a | | 2.05 | 0 | 3.0 | 0.00 | 6.0 |
| 20 ml | 3.66 | 15.8 | 4.3 | 0.38 | 1.38 | 5.82 |
| 25 ml | 4.02 | 19.4 | 4.9 | 0.30 | 1.25 | 5.82 |
| 30 ml | 4.29 | 21.4 | 5.0 | 0.28 | 1.18 | 5.82 |
| 40 ml | 5.55 | 21.2 | 3.8 | 0.27 | 0.87 | 5.56 |
| 50 ml | 5.95 | 21.8 | 4.6 | 0.21 | 0.81 | 5.56 |
| Starting Solution b | 4.16 | 2.05 | 0.48 | 3.0 | 1.25 | 6.0 |
| 20 ml | 2.41 | 17.5 | 7.3 | 0.35 | 2.13 | 5.93 |
| 25 ml | 2.91 | 22.7 | 7.8 | 0.27 | 1.77 | 5.93 |
| 30 ml | 2.85 | 24.5 | 8.6 | 0.25 | 1.81 | 5.93 |
| 40 ml | 2.98 | 23.8 | 8.0 | 0.24 | 1.64 | 5.63 |
| 50 ml | 3.44 | 30.6 | 8.9 | 0.19 | 1.42 | 5.63 |
| Starting Solution c | 2.07 | 2.05 | 0.99 | 3.0 | 2.52 | 6.0 |
| 25 ml | 2.06 | 19.9 | 9.7 | 0.30 | 2.51 | 5.97 |
| 30 ml | 2.08 | 24.6 | 11.7 | 0.25 | 2.48 | 5.97 |
| 35 ml | 2.34 | 25.7 | 10.8 | 0.24 | 2.20 | 5.97 |
| 40 ml | 2.12 | 26.0 | 12.1 | 0.22 | 2.26 | 5.53 |
| 50 ml | 2.60 | 30.0 | 11.5 | 0.19 | 1.85 | 5.53 |

Even with the sodium silicate solutions containing a relatively high proportion of sodium (i.e. the D sodium silicates) it is evident that the addition of ammonia to the sodium silicate solution before treatment with the ammonia loaded resin helps maintain the concentration of $SiO_2$ and increases the proportion of ammonia to $Na_2O$ in the final product.

*Example 5*

In the following series of tests the $SiO_2$ concentration was raised to 10% using the same D sodium silicate. Starting solution $d$ was prepared using 68.0 grams of D and 132.0 grams of water.

Starting double silicate solution $e$ was prepared with 68.0 grams of D, 122.6 grams of water and 9.4 grams of aqueous ammonia.

Starting double silicate solution $f$ was prepared with 68.0 grams of D, 113.0 grams of water and 19.0 grams of aqueous ammonia.

As before, 20 grams of these starting solutions were treated for six minutes with the saturated ammonia resin as shown in the following table:

silica ratio "S-35" sodium silicate mixtures of Example 2. The amount of resin used with the 20 grams of solution cannot be increased above 50 ml. since such mixtures are semi-solid because of the absorption of the solution by the resin.

*Example 6*

In this example the starting double silicate solution $g$ was prepared by diluting 250 grams of "S-35" with 218.2 grams of water and adding 59.8 grams of aqueous ammonia. A slightly hazy, stable solution was obtained with 3.20% $Na_2O$, 5.02% $(NH_4)_2O$, 12.0% $SiO_2$ and a mole ratio of $SiO_2$ to $Na_2O$ of 3.87, and a $SiO_2/(NH_4)_2O$ ratio of 2.07.

A somewhat similar double silicate starting solution $h$ was prepared having 2.67% $Na_2O$, 4.18% $(NH_4)_2O$, 10.0% $SiO_2$, and the same mole ratios. When 20 gram portions of these two starting solutions were treated with the saturated ammonia loaded resin for 6 minutes the results were as shown in the following table. While the results are not as good as those obtained with 6% $SiO_2$ they show that solutions with 10% or more of $SiO_2$ may be treated in this way.

| Amount of Resin | Mole Ratios | | | $Na_2O$ (percent) | $(NH_4)_2O$ (percent) | $SiO_2$ (percent) |
|---|---|---|---|---|---|---|
| | $SiO_2/(NH_4)_2O$ | $SiO_2/Na_2O$ | $(NH_4)_2O/Na_2O$ | | | |
| Starting Solution g | 2.07 | 3.87 | 1.87 | 3.20 | 5.02 | 12.00 |
| 15 ml | 2.31 | 19.0 | 8.2 | 0.65 | 4.49 | 11.93 |
| 20 ml | 2.54 | 24.2 | 9.5 | 0.51 | 4.12 | 11.93 |
| 30 ml | (¹) | (¹) | (¹) | (¹) | (¹) | (¹) |
| Starting Solution h | 2.07 | 3.87 | 1.87 | 2.67 | 4.18 | 10.00 |
| 25 ml | 2.56 | 34.0 | 13.3 | 0.30 | 3.33 | 9.86 |
| 30 ml | 2.55 | 39.0 | 15.3 | 0.24 | 3.16 | 9.28 |
| 35 ml | 2.65 | 47.8 | 18.0 | 0.20 | 3.03 | 9.28 |
| 40 ml | 2.82 | 53.3 | 18.9 | 0.18 | 2.86 | 9.28 |
| 45 ml | 2.94 | 68.4 | 23.2 | 0.14 | 2.74 | 9.28 |

¹ Too viscous to handle.

*Example 7*

In this example we have demonstrated the usefulness

| Amount of Resin | Mole Ratios | | | $Na_2O$ (percent) | $(NH_4)_2O$ (percent) | $SiO_2$ (percent) |
|---|---|---|---|---|---|---|
| | $SiO_2/(NH_4)_2O$ | $SiO_2/Na_2O$ | $(NH_4)_2O/Na_2O$ | | | |
| Starting Solution d | | 2.05 | 0 | 5.0 | 0 | 10.0 |
| 30 ml | 3.95 | 22.0 | 5.6 | 0.44 | 2.06 | 9.37 |
| 45 ml | 4.62 | 35.8 | 7.8 | 0.27 | 1.76 | 9.37 |
| Starting Solution e | 4.16 | 2.05 | 0.49 | 5.0 | 2.08 | 10.0 |
| 30 ml | 2.56 | 23.3 | 9.0 | 0.42 | 3.20 | 9.46 |
| 40 ml | 2.84 | 28.8 | 10.1 | 0.34 | 2.89 | 9.46 |
| Starting Solution f | 2.07 | 2.05 | 0.99 | 5.0 | 4.20 | 10.0 |
| 30 ml | 2.19 | 22.7 | 10.4 | 0.43 | 3.75 | 9.47 |
| 40 ml | 2.51 | 30.6 | 12.2 | 0.32 | 3.27 | 9.47 |

Again, the higher ammonia content in the double silicate protected the silica and increased the residual ammonia in the final ammonium silicate solution. However, the sodium removal is much poorer than in the higher of our ammonium silicate solutions for deflocculating clay. A mixture of 315.9 grams of "S-35," 941.8 grams of water and 75.6 grams of aqueous ammonia was prepared and treated for six minutes wtih 2,000 ml. of the aforesaid saturated ammonia resin. The resulting stable ammonium silicate solution contained 0.11% of $Na_2O$, 2.02% of $(NH_4)_2O$, 5.73% of $SiO_2$ and had mole ratios of $SiO_2/Na_2O$ of 53.8 and $SiO_2/(NH_4)_2O$ of 2.46.

This ammonium silicate solution was used as a deflocculating agent for mixtures containing 20% of Barden clay. Barden clay is an air-separated kaolin clay obtained from Huber Bros. Inc. A total of 320 grams of the ammonium silicate solution diluted with water was prepared and Barden clay added to the solution. The final mixture was agitated with a Hamilton-Beach mixer for one minute and then allowed to stand for one minute. The viscosity was then determined using a Brookfield viscometer with the No. 3 spindle used at 50 r.p.m. for thirty seconds. The following table of results shows that our ammonium silicate is an effective deflocculating agent for clay:

| Clay, g. | $H_2O$, g. | Silicate Soln. g. | Silicate Solids, g. | Viscosity Brookfield Value |
|---|---|---|---|---|
| 80 | 310.0 | 10.0 | 0.775 | 0 |
| 80 | 315.0 | 5.0 | 0.388 | 0 |
| 80 | 317.0 | 3.0 | 0.232 | 1.1 |
| 80 | 317.1 | 2.98 | 0.231 | 2.8 |
| 80 | 317.1 | 2.96 | 0.229 | 4.4 |
| 80 | 317.1 | 2.94 | 0.225 | 15.6 |
| 80 | 317.2 | 2.8 | 0.217 | 20.4 |
| 80 | 317.4 | 2.6 | 0.202 | 25.0 |
| 80 | 317.7 | 2.3 | 0.178 | 34.4 |
| 80 | 319.0 | 1.0 | 0.076 | 37.5 |
| 80 | 320.0 | --------- | --------- | 50.9 |

*Example 8*

The ammonium silicate of Example 7 was also used for the preparation of a cold setting water-resistant adhesive. A cold setting adhesive was prepared with 24.0 grams of Purina protein, an isolated soy protein sold by Ralston Purina Co., (8.0%), 44.0 grams of Paragon clay (14.65%), 132.0 grams of ammonium silicate (43.95%), 100 grams of water (33.3%) and 0.25 gram of sodium sulfite (0.08%). A smooth, uniform mixture was obtained having 2.52% of $SiO_2$. After aging one hour it had a viscosity at 25° C. of 500 stormer seconds (plus 100 grams). After five hours the viscosity was 230 seconds, after 26 hours it was 224 seconds and after 71 hours it was 142 seconds. The mixture thinned out somewhat more on storage for 14 days but showed no sign of spoilage.

This cold setting composition was used to bond corrugated specimens of B flute single face Chemfiber medium and Wethertex liner, both obtained from International Paper Co. Four specimens measuring 2 x 3 inches were prepared and the samples aged for 3 days at 75° F. at 50% humidity. They were then cut into ½ inch strips for the determination of dry strength, ½ hour soaking strength and 24 hours soaking strength, and the strength after soaking for 24 hours and redrying for one week under standard conditions. Tensile strength is given in pounds per 12 inches of flute tip length. The dry strength was 29.2 lbs.; after 0.5 hour soaking and after 24 hours soaking the strength was about 1.5 lbs.; and after 24 hours soaking and redrying the strength was again 27.6 lbs. This is a very satisfactory performance.

Other samples of this bond were heat set by heating on a hot plate at 360° F. for 10 seconds. After aging as before, these samples had a dry strength of 41.6 lbs. and a redried strength after soaking for 24 hours of 45.2 lbs.

More or less detailed claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. For example, other selective means such as permselective membranes and electrolytic processes are quite possibly applicable to the present invention. It is intended that all such obvious equivalents be encompassed within the scope of this invention and patent grant in accordance with the well-known doctrine of equivalents, as well as changed proportions of the ingredients which do not render the composition unsuitable for the disclosed purposes.

What is claimed is:
1. The method which comprises:
   (a) introducing an aqueous solution of an alkali metal silicate into a reaction zone,
   (b) also introducing into said reaction zone a material selected from the group consisting of ammonia and ammonium hydroxide and bringing said material into admixture with said alkali metal silicate to thereby produce a double silicate solution of an alkali metal and ammonia, said double silicate containing from 1 to 12% $SiO_2$ and having a ratio of from 2 to 6 $SiO_2/(NH_4)_2O$, 2 to 4 $SiO_2/Na_2O$ and 0.4 to 2.5 $(NH_4)_2O/Na_2O$,
   (c) contacting said double silicate solution with a cation exchange resin that is between about 75 and 100% saturated with ammonia;
   (d) recovering an ammonium silicate solution that has:
      (1) a ratio of $SiO_2$ to alkali metal oxide of at least 25; and
      (2) a ratio of $(NH_4)_2O$ to alkali metal oxide of at least 8; and
      (3) an average silica micelle size that does not exceed about 3 millimicrons in diameter.
2. A method according to claim 1 wherein said alkali metal silicate is sodium silicate.
3. The process of claim 2 in which the cation exchange resin in a highly cross-linked nuclear sulfonic acid.
4. The process of claim 2 in which the ratio of solution of double silicate to resin in the step of treating the double silicate is from 0.45 to 2.5 gr./ml. and the contact time is greater than about 4 minutes.
5. An ammonium silicate solution with silica micelles less than 5 millimicrons in diameter and containing from 1 to 12% $SiO_2$; a $SiO_2$ to alkali metal oxide ratio of between about 25 and 150; a $(NH_4)_2O$ to alkali metal oxide ratio of between about 8 and 40; and a ratio of $SiO_2$ to $(NH_4)_2O$ of between about 2 and 8.
6. The ammonium silicate solution of claim 5 containing a water miscible organic solvent.

References Cited

UNITED STATES PATENTS

| Re. 25,252 | 10/1962 | Reuter et al. | 252—313 |
| 2,978,419 | 4/1961 | Birkhimer | 252—313 |
| 3,012,050 | 12/1961 | Fox et al. | 23—110 X |

FOREIGN PATENTS

| 66,783 | 9/1957 | France. |

OSCAR R. VERTIZ, *Primary Examiner.*

A. J. GREIF, *Assistant Examiner.*

UNITED STATES PATENT OFFICE
CERTIFICATE OF CORRECTION

Patent No. 3,346,334                                      October 10, 1967

Helmut Hans Wilhelm Weldes et al.

It is hereby certified that error appears in the above numbered patent requiring correction and that the said Letters Patent should read as corrected below.

Column 2, line 21, for "remve" read -- remove --; line 41, for "porduct" read -- product --; line 51, for "slurred" read -- slurried --; same column 2, line 68, for "loading" read -- loadings --; column 3, line 5, for "reasonable" read -- reasonably --; line 28, after "alkali" insert -- metal --; line 31, for "sadium" read -- sodium --; line 37, for "longer' read -- larger --; line 49, for "$(CNH_4)_2O$" read -- $(NH_4)_2O$ --; column 4, line 28, for "solid" read -- sold --; columns 5 and 6, in the second table, seventh column, line 6 thereof, for "5.87" read -- 5.83 --; same table, seventh column, line 8 thereof, for "5.03" read -- 5.70 --; column 6, line 1, before "about" insert -- to --; same column 6, lines 58, 70, 72, and 74, and column 7, lines 24, 33, 34, 37, and 40, for "D", each occurrence, read -- "D" --; column 8, line 75, for "wtih" read -- with --; column 9, line 50, for "Wethertex" read -- Weathertex --.

Signed and sealed this 24th day of December 1968.

(SEAL)
Attest:

EDWARD M. FLETCHER, JR.                        EDWARD J. BRENNER
Attesting Officer                                  Commissioner of Patents